W. FLENTJE.
FURROWING MACHINE.
APPLICATION FILED MAY 2, 1908.

902,388.

Patented Oct. 27, 1908.
2 SHEETS—SHEET 2.

Witnesses
F. C. Gibson.
K. Allen

Inventor
William Flentje.

By Victor J. Evans
Attorney

UNITED STATES PATENT OFFICE.

WILLIAM FLENTJE, OF MUSKEGON, MICHIGAN.

FURROWING-MACHINE.

No. 902,388.    Specification of Letters Patent.    Patented Oct. 27, 1908.

Application filed May 2, 1908. Serial No. 430,598.

*To all whom it may concern:*

Be it known that I, WILLIAM FLENTJE, a citizen of the United States, residing at Muskegon, in the county of Muskegon and State of Michigan, have invented new and useful Improvements in Furrowing-Machines, of which the following is a specification.

This invention relates to furrowing machines, and the object of the invention is to provide a device of this character having a plurality of plow blades which are adapted to be raised or lowered simultaneously and retained in adjusted position through the medium of a single lever.

Another object of the invention is to provide a machine of this character with a crank arm of peculiar construction connected with the plow beams whereby a great amount of leverage is obtained so that the beams may be quickly and easily raised or lowered as desired.

With these and other objects in view the invention resides in the novel construction of elements and their arrangement in operative combination, hereinafter fully described and claimed.

Figure 1:
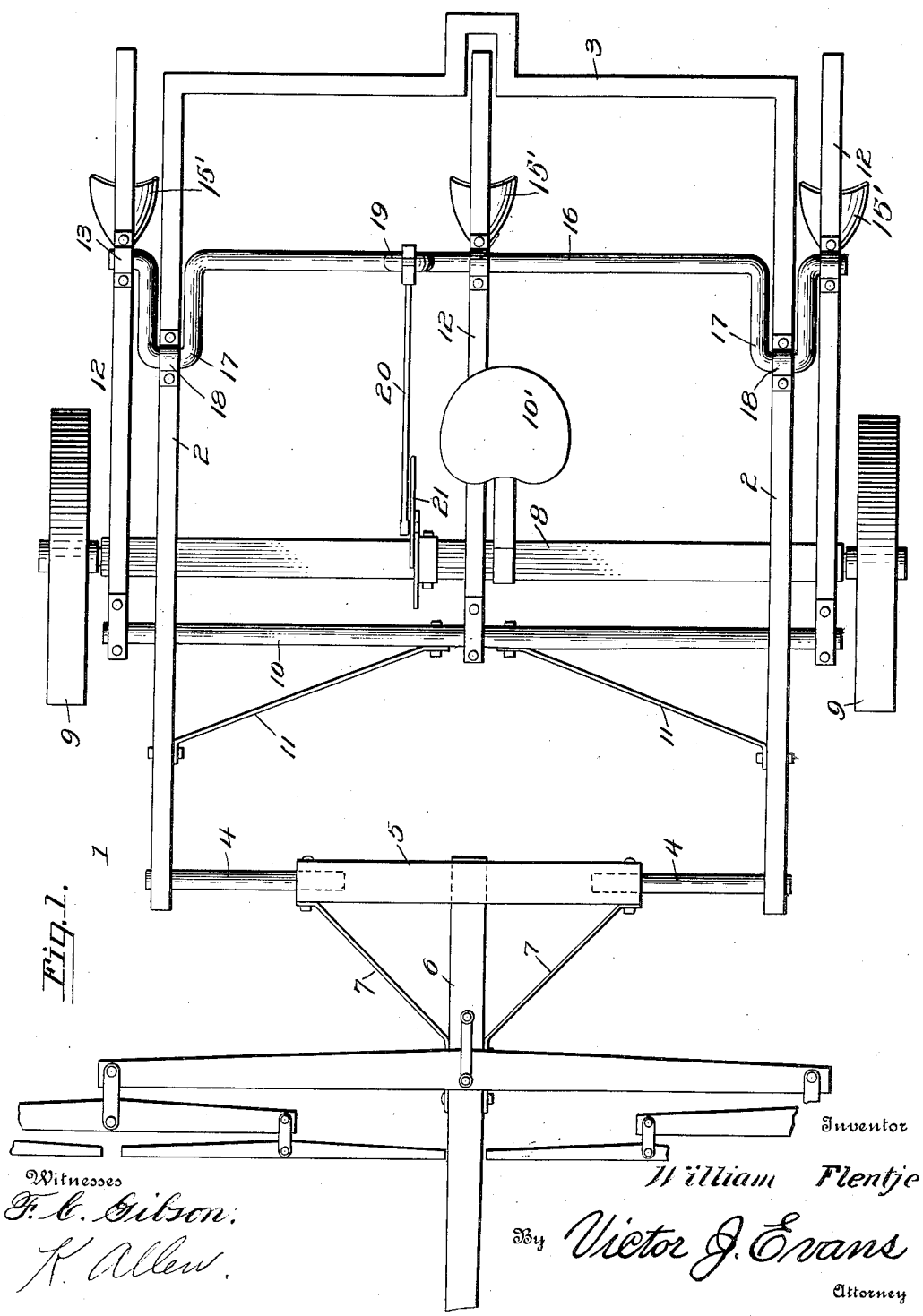
Figure 2:
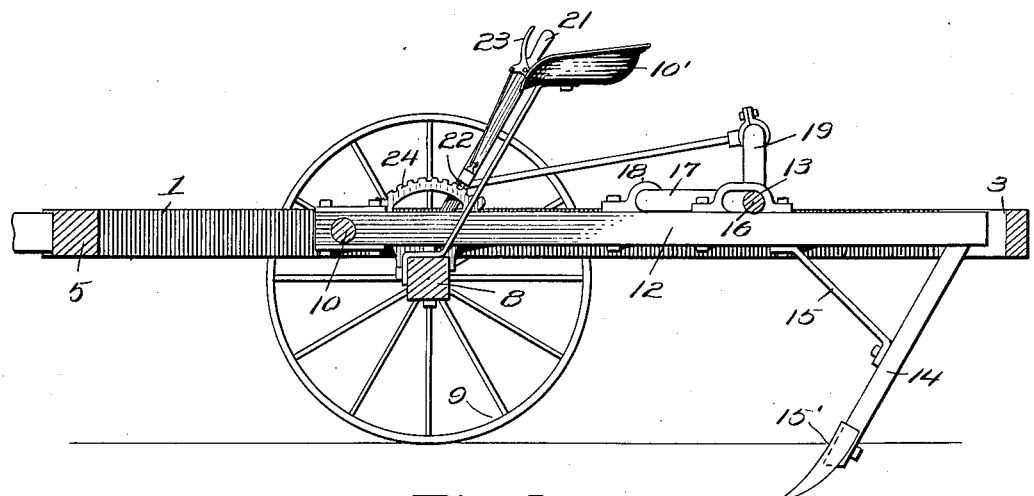
Figure 3:
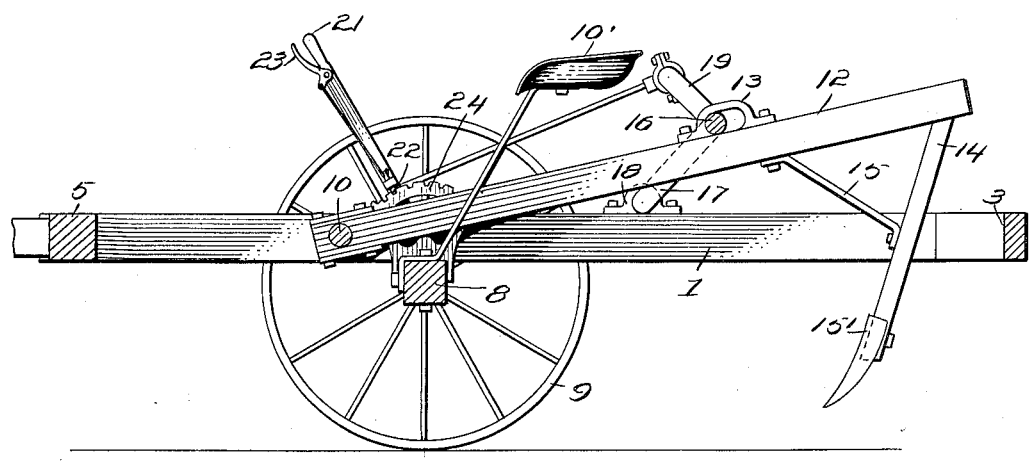

In the accompanying drawings, Figure 1 is a top plan view of a device constructed in accordance with the present invention. Fig. 2 is a longitudinal sectional view upon the line 2—2 of Fig. 1, showing the plow blade lowered. Fig. 3 is a similar view showing the plow blade raised.

In the accompanying drawings the numeral 1 designates the frame of a machine. The frame 1 comprises side bars 2 and a rear connection 3. The front of the frame is open and the side bars adjacent the front are provided with suitable openings adapted for the reception of stub shafts 4 secured upon a bar 5 connected with the pole 6 of the device. The bar 5 and pole 6 are provided with the braces 7 to more effectively secure the parts together, and the pole is provided with the usual double trees by which the animals are secured to the device. The frame 1 is provided with a transverse axle 8 having the usual wheels 9, and upon which is positioned the spring seat 10.

Secured between the side bars 2 immediately in front of the axle 8 is a shaft 10. This shaft 10 is provided with suitable braces 11 by which it is retained securely upon the frame of the device and the shaft has its ends projecting a suitable distance beyond each of the sides 2. These projecting portions of the shaft, as well as the center of the shaft are adapted for the reception of the rearwardly extending beams 12. The beams 12 have their upper faces provided with suitable eyes or guide ways 13 and are provided with the downwardly extending bars 14 upon which are secured the plow blades 15. These bars 14 are preferably arranged at an angle to the beams 12 and are effectively braced by the angle irons 15'.

Mounted within the eyes 13 of the beams 12 is a rock shaft 16. This shaft 16 is provided with a pair of offsets 17 adapted to engage suitable eyes 18 provided by the sides 2 of the frame. By this arrangement it will be noted that a short crank arm engages the eyes 13 of the outer beams 12 while a crank arm extending nearly the entire width of the machine engages the center beam 12, thus providing a great amount of leverage for the beams and allowing for the easy movement of the same in positioning the plow blades in the soil or withdrawing them therefrom. The enlarged longitudinally extending crank arm is provided with an offset 19, adapted for engagement with a link 20 secured upon a lever 21 provided with a spring pressed tooth 22 adapted to be operated by a handle 23 and to engage one of the teeth of a segment 24 secured upon the axle 8.

Having thus fully described the invention what is claimed as new is:

In a machine of the character described, a frame, an axle having wheels upon the frame, a shaft secured to the frame and having its ends projecting beyond the sides of the frame, plow beams secured to the projecting portions and to the center of the shaft, eyes upon the beams, a shaft for the eyes, eyes upon the sides of the frame, the shaft being provided with offsets engaging the eyes of the frame, an offset upon the shaft, a link for the offset connecting a lever having a spring pressed pawl engaging a toothed segment upon the axle of the machine.

In testimony whereof I affix my signature in presence of two witnesses.

WILLIAM FLENTJE.

Witnesses:
 HENRY H. GAIDER,
 EMIL SPLETTSTOSER.